March 21, 1967 B. J. HAVENS 3,310,800
SYSTEM FOR CONVERTING A DECIMAL FRACTION OF A DEGREE TO MINUTES
Filed May 12, 1964 4 Sheets-Sheet 1
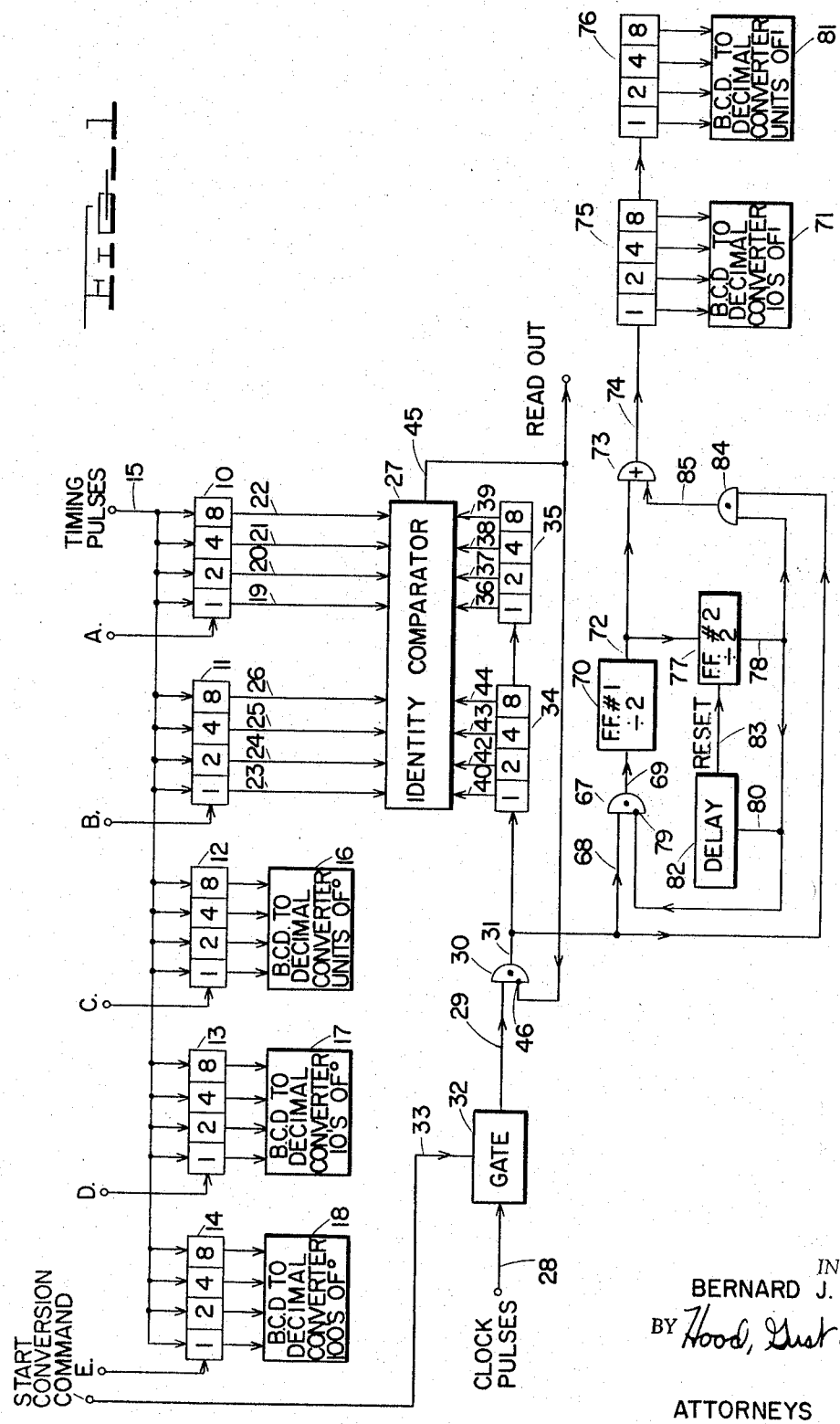
INVENTOR.
BERNARD J. HAVENS
BY Hood, Gust + Irish
ATTORNEYS

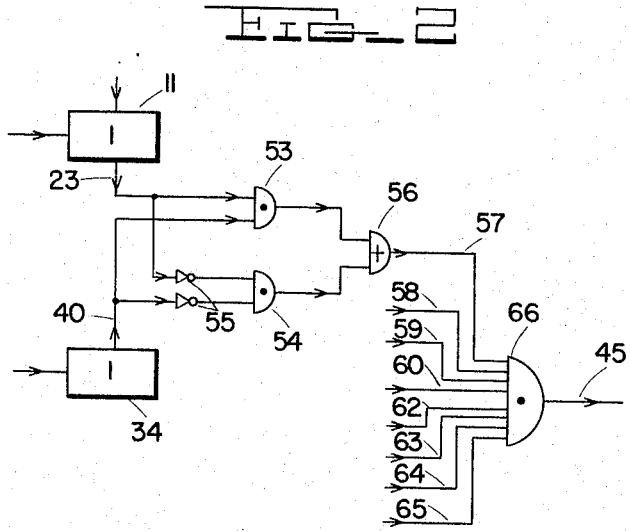
FIG_2
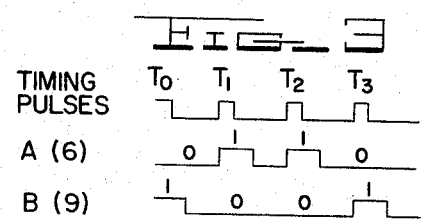
FIG_3
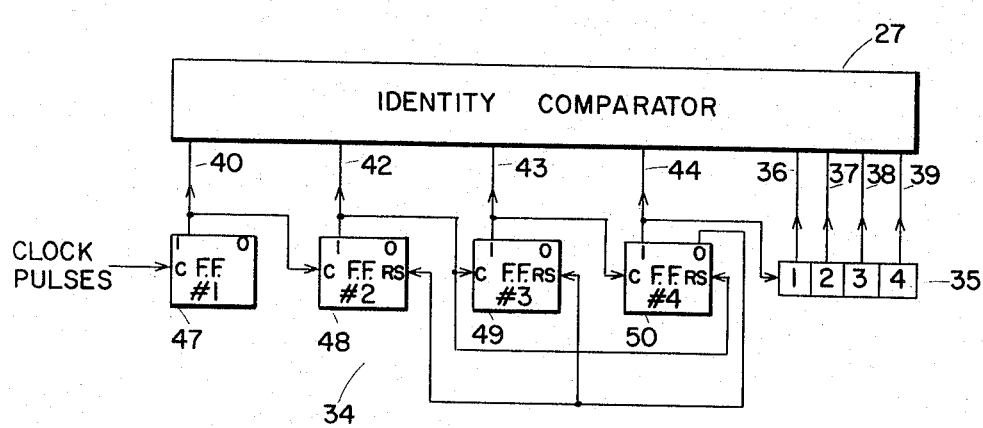
FIG_4

March 21, 1967  B. J. HAVENS  3,310,800
SYSTEM FOR CONVERTING A DECIMAL FRACTION OF A DEGREE TO MINUTES
Filed May 12, 1964  4 Sheets-Sheet 3
FIG_5
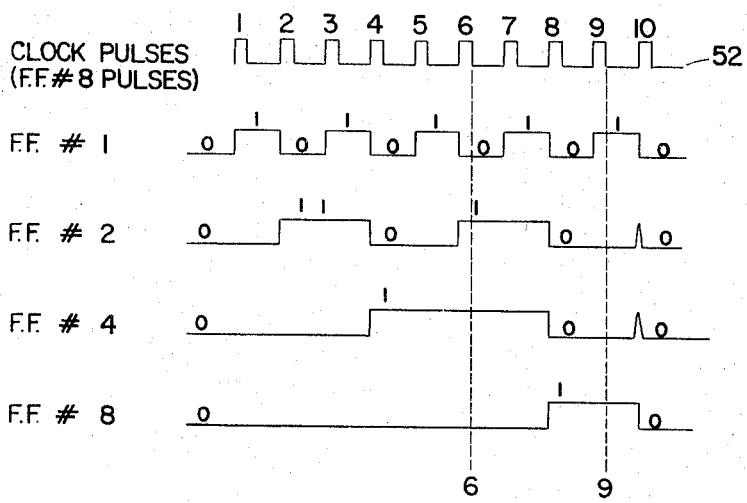
FIG_6
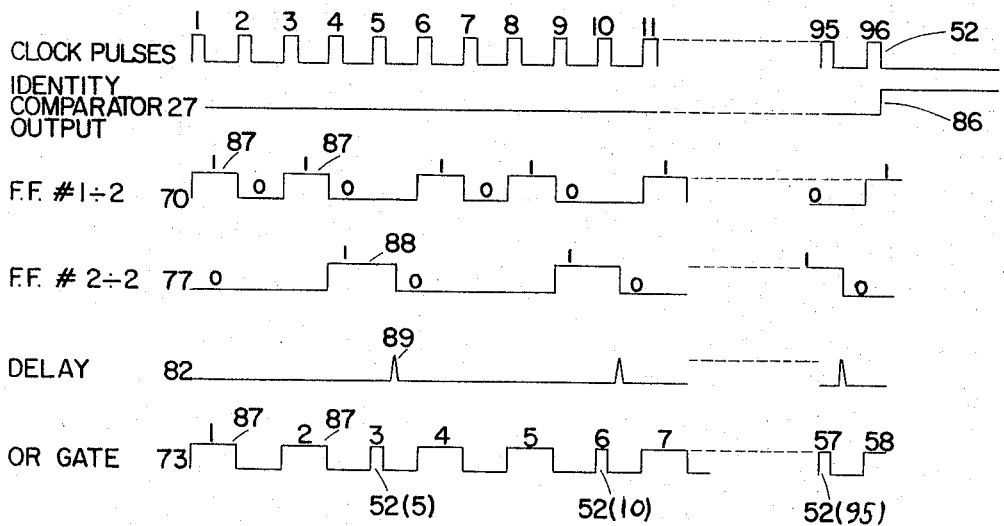
INVENTOR.
BERNARD J. HAVENS
BY Hood, Gust & Irish
ATTORNEYS

INVENTOR.
BERNARD J. HAVENS

United States Patent Office 3,310,800
Patented Mar. 21, 1967

3,310,800
SYSTEM FOR CONVERTING A DECIMAL FRACTION OF A DEGREE TO MINUTES
Bernard J. Havens, Fort Wayne, Ind., assignor to International Telephone and Telegraph Corporation, Nutley, N.J., a corporation of Maryland
Filed May 12, 1964, Ser. No. 366,868
12 Claims. (Cl. 340—347)

This invention relates generally to a system for converting a decimal fraction of a degree to the corresponding minutes, and more particularly to a system for converting electrical signal information in binary coded form indicating a decimal fraction of a degree to electrical signal information indicating the corresponding minutes.

One of the outputs of computing or other data processing apparatus in certain navigational systems may be degrees in decimal form including a decimal fraction of a degree. Such information is conventionally coded in binary form for storage and subsequent utilization and/or display. Conventional logic conversion systems will convert the binary coded decimal fraction to digital form, however, there are instances in which it is desired that the binary coded decimal fraction of a degree be converted to minutes for display.

It is accordingly an object of the invention to provide a system for converting a decimal fraction of a degree to corresponding minutes.

Another object of the invention is to provide a system for converting electrical signal information indicating a decimal fraction of a degree to electrical signal information indicating the corresponding minutes.

A further object of the invention is to provide a system for converting input electrical signal information in binary coded form indicating a two place decimal fraction of a degree to output electrical signal information indicating the corresponding minutes to the nearest half minute.

In accordance with the broader aspects of the invention, means are provided for counting a train of pulses and for providing electrical signal information indicating the number of pulses counted in the same form as the input electrical information which indicates a decimal fraction of a degree. Means are provided for comparing the input and the other electrical signal information and for providing a stop signal when the input and other electrical signal information respectively indicate the same number, the stop signal being employed to terminate the train of pulses so that the number of pulses in the train is equal to the decimal fraction. Conversion is accomplished by providing three other pulses in response to every five successive pulses of the train thus multiplying the decimal fraction by sixty (60) to yield minutes. Means are provided for counting the other pulses and for providing output signal information indicating the number of such other pulses.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a schematic illustration of the system of the invention;

FIG. 2 is a schematic illustration of a form of identity comparator which may be employed in the system of FIG. 1;

FIG. 3 is a diagram showing the binary code for the numerals six (6) and nine (9), useful in explaining the operation of the system of the invention;

FIG. 4 is a schematic illustration of a form of binary coded decimal register which may be employed in the system of the invention;

FIG. 5 is a diagram useful in explaining the operation of the identity comparator of the system of FIG. 1;

FIG. 6 is a diagram useful in explaining the operation of the conversion portion of the system of the invention.

Figure 7:
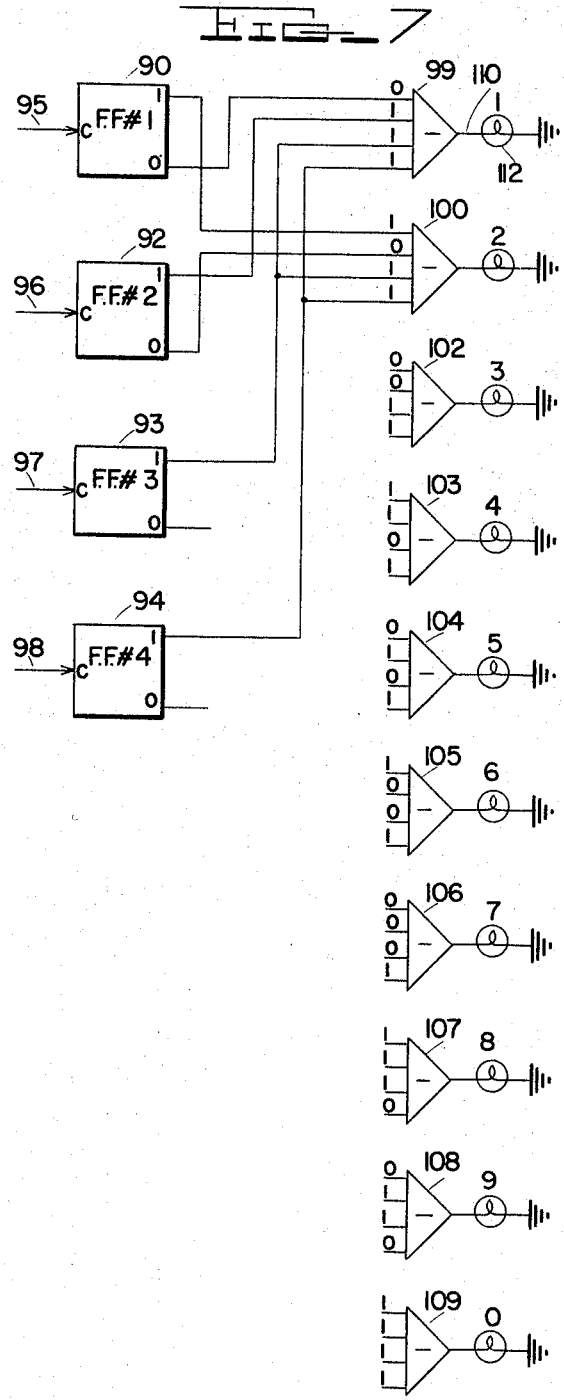
FIG. 7 is a schematic illustration showing a form of binary coded decimal-to-digital convertor which may be used in the system of the invention.

Assuming that electrical signal information is provided in binary coded form indicating a five (5) digit decimal number which, when converted to decimal form, yields some number such as 672.96° and that it is further desired to convert the last two (2) digits representing $96/100$ of a degree to minutes, it will be seen by reference to the following table that by multiplying the last two (2) digits by 60, correct minutes to the nearest one-half minute will result:

| Fraction | No.  | Display | Fraction | No.  | Display |
|----------|------|---------|----------|------|---------|
| .00      | 0    | 00      | .51      | 30.6 | 31      |
| .01      | .6   | 01      | .52      | 31.2 | 31      |
| .02      | 1.2  | 01      | .53      | 31.8 | 32      |
| .03      | 1.8  | 02      | .54      | 32.4 | 32      |
| .04      | 2.4  | 02      | .55      | 33.0 | 33      |
| .05      | 3.0  | 03      | .56      | 33.6 | 34      |
| .06      | 3.6  | 04      | .57      | 34.2 | 34      |
| .07      | 4.2  | 04      | .58      | 34.8 | 35      |
| .08      | 4.8  | 05      | .59      | 35.4 | 35      |
| .09      | 5.4  | 05      | .60      | 36.0 | 36      |
| .10      | 6.0  | 06      | .61      | 36.6 | 37      |
| .11      | 6.6  | 07      | .62      | 37.2 | 37      |
| .12      | 7.2  | 07      | .63      | 37.8 | 38      |
| .13      | 7.8  | 08      | .64      | 38.4 | 38      |
| .14      | 8.4  | 08      | .65      | 39.0 | 39      |
| .15      | 9.0  | 09      | .66      | 39.6 | 40      |
| .16      | 9.6  | 10      | .67      | 40.2 | 40      |
| .17      | 10.2 | 10      | .68      | 40.8 | 41      |
| .18      | 10.8 | 11      | .69      | 41.4 | 41      |
| .19      | 11.4 | 11      | .70      | 42.0 | 42      |
| .20      | 12.0 | 12      | .71      | 42.6 | 43      |
| .21      | 12.6 | 13      | .72      | 43.2 | 43      |
| .22      | 13.2 | 13      | .73      | 43.8 | 44      |
| .23      | 13.8 | 14      | .74      | 44.4 | 44      |
| .24      | 14.4 | 14      | .75      | 45.0 | 45      |
| .25      | 15.0 | 15      | .76      | 45.6 | 46      |
| .26      | 15.6 | 16      | .77      | 46.2 | 46      |
| .27      | 16.2 | 16      | .78      | 46.8 | 47      |
| .28      | 16.8 | 17      | .79      | 47.4 | 47      |
| .29      | 17.4 | 17      | .80      | 48.0 | 48      |
| .30      | 18.0 | 18      | .81      | 48.6 | 49      |
| .31      | 18.6 | 19      | .82      | 49.2 | 49      |
| .32      | 19.2 | 19      | .83      | 49.8 | 50      |
| .33      | 19.8 | 20      | .84      | 50.4 | 50      |
| .34      | 20.4 | 20      | .85      | 51.0 | 51      |
| .35      | 21.0 | 21      | .86      | 51.6 | 52      |
| .36      | 21.6 | 22      | .87      | 52.2 | 52      |
| .37      | 22.2 | 22      | .88      | 52.8 | 53      |
| .38      | 22.8 | 23      | .89      | 53.4 | 53      |
| .39      | 23.4 | 23      | .90      | 54.0 | 54      |
| .40      | 24.0 | 24      | .91      | 54.6 | 55      |
| .41      | 24.6 | 25      | .92      | 55.2 | 55      |
| .42      | 25.2 | 25      | .93      | 55.8 | 56      |
| .43      | 25.8 | 26      | .94      | 56.4 | 56      |
| .44      | 26.4 | 26      | .95      | 57.0 | 57      |
| .45      | 27.0 | 27      | .96      | 57.6 | 58      |
| .46      | 27.6 | 28      | .97      | 58.2 | 58      |
| .47      | 28.2 | 28      | .98      | 58.8 | 59      |
| .48      | 28.8 | 29      | .99      | 59.4 | 59      |
| .49      | 29.4 | 29      | .00      | 00   | 00      |
| .50      | 30.0 | 30      |          |      |         |

Examination of the above table will indicate that for each two (2) decimal values, the same equivalent minute is displayed except for every fifth decimal value where the equivalent minute is displayed only once.

Referring now to the figures of the drawing, the circuitry to accomplish the conversion shown in the above table will be described.

Referring particularly to FIG. 1, a system is shown for connection to five (5) serially loaded binary coded data lines identified as A, B, C, D, and E; lines A and B respectively carry the serially loaded binary code for the units and tens of the decimal fraction of one degree (1°) while lines C, D, and E respectively carry the serially loaded binary code for units, tens and hundreds of degrees.

Data lines A, B, C, D, and E are respectively connected to the input circuits of conventional four-digit shift registers 10, 11, 12, 13 and 14. Timing pulse line 15 is respectively connected to each of the shift registers for shifting the serially loaded binary coded information on the data lines A, B, C, D and E into the shift registers, as is well known to those skilled in the art. Each of the shift registers 10–14 has four (4) output circuits into which the binary coded information is loaded in parallel. It will be readily understood that the binary coded information may initially be provided in parallel loaded form rather than in serially loaded form, in which case conventional static registers would be employed rather than the shift registers shown. Parallel loaded output circuits of shift registers 12, 13 and 14 are respectively coupled to conventional binary coded decimal-to-decimal convertors 16, 17 and 18 for converting the binary coded information respectively to units of degrees, tens of degrees and hundreds of degrees.

In order to convert the decimal fraction of one degree appearing in parallel loaded binary coded form in the output circuits of the shift registers 10 and 11 to minutes, the arrangement now to be described is provided. The parallel loaded output circuits 19, 20, 21 and 22 of shift register 10, and 23, 24, 25 and 26 of shift register 11 are coupled to identity comparator circuit 27 to be hereinafter more fully described. A clock pulse input circuit 28 is provided adapted to be connected to a source of clock pulses (not shown). Clock pulse input circuit 28 is coupled to the input circuit 29 of a conventional AND gate 30 by a conventional gating circuit 32. Gating circuit 32 has a gating signal input circuit 33 for receiving a "start conversion command" signal thereby to actuate gating circuit 32 to pass clock pulses to the AND gate 30. The output circuit 31 of the AND gate 30 is coupled to binary coded decimal register 34, which in turn is serially coupled with binary coded decimal register 35. Binary coded decimal registers 34, 35 count the clock pulses from the AND gate 30 and respectively convert the number of clock pulses counted to binary coded form loaded in parallel in their output circuits 36, 37, 38, 39 and 40, 42, 43, 44, respectively. The parallel loaded output circuits of the binary coded decimal registers 34, 35 are coupled to the identity comparator circuit 27. The identity comparator circuit 27 compares the decimal fraction of one degree in binary-coded-decimal form loaded in parallel on the output circuits of the shift registers 10, 11 with the number of clock pulses counted by the binary coded decimal registers 34, 35 and when the number of clock pulses so counted equals to the decimal fraction of a degree, i.e., when identity occurs a stop signal is generated in the output circuit 45 of identity comparator circuit 27. Output circuit 45 of the identity comparator circuit 27 is coupled to an inhibit circuit 46 of the AND gate 30 and thus, the stop signal generated by the identity comparator circuit 27 in response to identity of the decimal fraction and the number of clock pulses, inhibits the AND gate 30 to terminate the input of clock pulses to the binary coded decimal registers 34, 35.

Referring now to FIGS. 2, 3, 4 and 5, it will be assumed that the decimal fraction appearing in binary coded decimal form on data lines A and B is ninety-six (96). Thus, the binary code 1–0–0–1 for the numeral nine (9) will serially appear in data line B and will be accumulated and loaded in parallel on the output circuits 23, 24, 25, 26 of shift register 11 (FIG. 1). Likewise, the binary code 0–1–1–0 for the numeral six (6) will serially appear on data line A and will be accumulated and loaded in parallel on the output circuits 19, 20, 21, 22 of shift register 10 (FIG. 1).

The binary coded decimal registers 34, 35 may take the form of conventional 1–2–4–8 decade counter circuits as shown in FIG. 4. Each of the binary coded decimal registers 34, 35 may thus comprise four (4) conventional bistable multivibrator or flip-flop circuits 47, 48, 49 and 50 with their counting or "c" input circuits respectively connected in series and with their "one" output circuits respectively coupled to output circuits 36, 37, 38, 39 and 40, 42, 43, 44. In order to provide the 1-2-4-8 decade counting, the "zero" output circuits of the number eight flip-flop 50 is coupled to the reset circuit of the number two and number four flip-flops 48, 49 and the "one" output circuit of the number two flip-flop 48 is coupled to the reset circuit of the number eight flip-flop 50, as shown in FIG. 4.

Referring now to FIG. 5, it will be seen that when ninety-six (96) of the clock pulses 52 have been loaded into the binary coded decimal registers 34, 35 by the AND gate 30, the binary code 1–0–0–1 for the decimal nine (9) will be loaded in parallel in the output circuits 40, 42, 43, 44 of register 34 and the binary code 0–1–1–0 for the decimal six (6) will be loaded in parallel on the output circuits 36, 37, 38, 39 of the register 35; it will be recalled that the binary code 1–0–0–1 for the decimal nine (9) had previously been loaded in parallel on the output circuits 23, 24, 25, 26 of the shift register 11 and the binary code 0–1–1–0 for the decimal six (6) had previously been loaded in parallel in the output circuits 19, 20, 21, 22 of the shift register 10. Thus, it is seen that the binary coded decimal form for the same number, i.e., ninety-six (96) appears in the output circuits of binary coded decimal registers 34, 35 and in the output circuits of the shift registers 11, 10.

Referring now to FIG. 2, in one form of identity comparator circuit which may be employed for the identity comparator 27, output circuits 40 and 23 of the corresponding sections one and one of the binary coded decimal register 34 and shift register 11 are respectively connected to the input circuits of AND gate 53 and also to the input circuits of AND gate 54 by conventional inverters 55. The output circuits of the AND gates 53, 54 are respectively connected to the input circuits of a conventional OR circuit 56. It will thus be seen that if a "one" appears in both output circuits 23, 40, a "one" will appear in output circuit 57 of the OR circuit 56, and likewise, if a "zero" appears in both of the output circuits 23, 40, a "one" will appear in output circuit 57 of OR circuit 56. Thus, if there is identity of the signal in both of the output circuits 23, 24, a "one" will appear in output circuit 57. The remaining corresponding output circuits of binary coded decimal registers 34, 35 and shift registers 11, 10 are similarly connected with their respective output circuits 58, 59, 60, 62, 63, 64, 65 along with output circuit 57 connected to AND circuit 66. Thus, it is seen that when identity, either of "one" or "zero" is obtained in all of the corresponding output circuits of binary coded decimal registers 34, 35 and shift registers 11, 10, a "one" will appear in each of the output circuits 57, 58, 59, 60, 62, 63, 64, 65 in turn providing the "stop" signal in the output circuit 45 of the AND circuit 66.

In order to multiply the decimal fraction of one degree by sixty to provide minutes, another AND gate 67 (FIG. 1) is provided having input circuit 68 connected to output circuit 31 of AND gate 30. AND gate 67 has its output circuit 69 coupled to the input circuit of a conventional bistable multivibrator 70 which provides one (1) pulse in its output circuit 72 in response to every two (2) of the clock pulses 52 passed by the AND gates 30 and 67. Bistable multivibrator 70 thus provides a divide-by-two function. Output circuit 72 of bistable multivibrator 70 is coupled to one (1) of the input circuits of OR circuit 73 which has its output circuit 74 coupled to serially connected four (4) digit binary coded decimal registers 75, 76. Output circuit 72 of bistable multivibrator 70 is also coupled to bistable multivibrator 77 which has its output circuit 78 coupled to inhibit circuit 79 of AND gate 67. Bistable multivibrator 77 thus provides one (1) pulse in response to every two (2) pulses provided by bistable multivibrator 70 and thus performs another divide-by-two function; it will be seen (FIG. 6) that four (4) successive clock pulses 52 passed by the AND gates 30, 67 will result in the generation of one (1) pulse in the output circuit 78 of bistable multivibrator 77, this pulse being applied to the inhibit circuit 79 of the AND gate 67 to inhibit the same and thus to terminate the gating of clock pulses 52 to bistable multivibrator 70. It will further be seen that two (2) of the pulses provided by the bistable multivibrator 70 in response to four (4) successive clock pulses 52 will be loaded into the binary coded decimal registers 75, 76 prior to termination of the clock pulses by application of the pulse from the bistable multivibrator 77 to inhibit circuit 79 of AND gate 67.

Output circuit 78 of bistable multivibrator 77 is also coupled to the input circuit 80 of a conventional delay circuit 82 which has its output circuit 83 coupled to the reset circuit of bistable multivibrator 77. Output circuit 78 of bistable multivibrator 77 is also coupled to one (1) of the input circuits of AND gate 84 which has its other input circuit coupled to the output circuit 31 of AND gate 30 and which has its output circuit 85 coupled to the other input circuit of OR gate 73. It will thus be seen that when the pulse from bistable multivibrator 77, which is provided in response to four (4) clock pulses 52, if applied to AND gate 84 and also inhibits AND gate 67, clock pulses 52 passed by the AND gate 30, prior to inhibiting thereof by the "stop" pulse provided by the comparator circuit 27, will be passed by the AND gate 84 and by the OR circuit 73 to the binary coded decimal registers 75, 76. Delay circuit 82 delays the leading edge of the pulse provided by the bistable multivibrator 77 for a sufficient length of time to permit only one (1) pulse 52 passed by the AND gate 30 to be passed by the AND gate 84 and the OR gate 73, following which the delayed leading edge of the pulse from the bistable multivibrator 77 is applied to its reset circuit to terminate its pulse and to remove the inhibit from the AND gate 67. Thus, it is seen that out of five (5) successive clock pulses 52 applied to the AND gate 67, the first four (4) will be applied to bistable multivibrator 70 which would generate two (2) pulses in response thereto which will be passed by the OR circuit 73 and loaded into the binary coded decimal registers 75, 76, with the fifth (5th) one of the group of five (5) successive clock pulses 52 being passed by the AND gate 84 and the OR gate 73 and loaded into the registers 75, 76.

It will now be seen that three (3) pulses are loaded into the binary coded decimal registers 75, 76 for every five (5) successive clock pulses 52 passed by the AND gate 30, thus providing the function of multiplying the decimal fraction of one degree by sixty (60). Registers 75, 76 respectively have their parallel loaded output circuits coupled to conventional binary coded decimal-to-decimal convertors 71, 81 displaying units of minutes and tens of minutes.

Referring now particularly to FIG. 6, it will again be assumed that the decimal fraction of one degree to be converted to minutes is ninety-six (96) and thus, as above described, a total of ninety-six (96) clock pulses 52 will be passed by the AND gate 30 before generation of the "stop" pulse 86 by the identity comparator circuit 27 and its application to the inhibit circuit 46 of the AND gate 30 to terminate the train of pulses 52 passed thereby. It will be seen that the first four (4) clock pulses 52 of each group of five (5) successive clock pulses 52 passed by the AND gate 30 will result in the generation of two (2) pulses 87 which are passed by the OR circuit 73 and are loaded into the binary coded decimal registers 75, 76. Each successive two (2) of the pulses 87 generated by the bistable multivibrator 70 results in the generation of a pulse 88 by the second bistable multivibrator or flip-flop circuit 77 which is applied to inhibit the AND gate 67 and thus temporarily to terminate application of the clock pulses 52 to the bistable multivibrator 70, thus permitting the fifth one of each successive group of five (5) clock pulses 52 to be passed by the AND gate 84 and the OR circuit 73 and thus loaded into the registers 75, 76. The delayed leading edge 89 of the pulse 88 is applied to reset bistable multivibrator 77 thus terminating the pulse 88 and removing the inhibit from the AND gate 67 thus in turn permitting application of the next successive four (4) clock pulses 52 to bistable multivibrator 70 and in turn application of the resulting two (2) pulses 87 to OR circuit 73 and the registers 75, 76.

Thus, it is seen that in response to the ninety-six (96) clock pulses 52 passed by the AND gate 30 before being inhibited by the "stop" signal 86 from the identity comparator 27, a total of fifty-eight (58) pulses are serially loaded into the binary coded decimal registers 75, 76 and reference to the table above will indicate that fifty-eight (58) is the equivalent in minutes of $96/100$ of one degree to the nearest half minute. It will be understood that the numeral eight (8) will be serially loaded into the register 76 and the numeral five (5) serially loaded into the register 75 and that these numerals in binary-coded decimal form will be loaded in parallel into the output circuits of registers 76, 75, respectively, and will be converted to decimal form by the convertors 71, 81.

Referring now to FIG. 7 in which one form of binary coded decimal-to-decimal converter is shown, converter 71 for example, may comprise four (4) conventional bistable multivibrators or flip-flops 90, 92, 93, 94 respectively having their counting input circuits coupled to the parallel loaded output circuits 95, 96, 97, 98 of the binary coded decimal register 75. Binary decimal registers 75, 76 are of the 1–2–4–8 variety and may be of the type shown in FIG. 4. In the form of converter illustrated, ten (10) NOR circuits 99, 100, 102, 103, 104, 105, 106, 107, 108 and 109 are provided each having four (4) input circuits. NOR circuit 99 has its input circuits respectively coupled to the "zero" output circuit of flip-flop 90, to the "one" output circuit of flip-flop 92, to the "one" circuits of flip-flop 93 and to the "one" output circuit of flip-flop 94. NOR circuit 100 has its input circuits respectively coupled to the "one" output circuits of flip-flops 90, 93 and 94 and to the "zero" output circuit of flip-flop 92. The remaining NOR circuits 102–109 have their input circuits respectively coupled to the "one" and "zero" output circuits of the flip-flops 90, 92, 93, 94 as indicated in FIG. 7. Each of the NOR circuits has its output circuit 110 coupled to a suitable indicating device 112, such as an indicating lamp. It will be readily understood that other forms of binary coded decimal-to-digital converters are available, being well known to those skilled in the art, and may be employed in place of the specific form shown in FIG. 7.

While I have described above the principles of my invention in connection with specific apparatus, it is to be clearly understood that this description is made only by way of example and not as a limitation to the scope of my invention.

What is claimed is:

1. A system for converting input electrical signal information indicating a decimal fraction of a degree to output electrical signal information indicating the corresponding minutes comprising: means for providing a train of first pulses; means for counting said pulses, said counting means including means for providing other electrical signal information of the same type as said input signal information indicating the number of first pulses counted thereby; means for comparing said input and other electrical signal information, said comparing means including means for providing a stop signal when said input and other electrical signal information respectively indicate the same number; means for terminating said train of first pulses in response to said stop signal whereby the number of said first pulses in said train is equal to said decimal fraction; means for providing three other pulses in response to every five successive first pulses of said train whereby the decimal fraction is multiplied by sixty; and means for counting said other pulses, said other pulse counting means including means for providing said output signal information indicating the number of said other pulses counted thereby.

2. The system of claim 1 wherein said means for providing said other pulses comprises: means for generating a second pulse in response to every two of said first pulses of said train whereby two successive second pulses are generated in response to four successive first pulses; means coupling said second pulses to said other pulse counting means; and means for inhibiting said second pulse generating means following generation of two successive second pulses during the occurrence of each fifth one of said first pulses immediately following said four successive first pulses, said inhibiting means including means for coupling said first pulses of said train to said other pulse counting means whereby two of said second pulses and the fifth one of each five successive first pulses are counted thereby.

3. The system of claim 1 wherein said means for providing said other pulses comprises: means for generating a second pulse in response to every two of said first pulses of said train, whereby two successive second pulses are generated in response to four successive first pulses; means coupling said second pulses to said other pulse counting means; means for generating a third pulse in response to every two of said second pulses; means for inhibiting said second pulse generating means in response to said third pulse, said inhibiting means coupling said first pulses of said train to said pulse counting means whereby each fifth one of said first pulses immediately following said four successive first pulses is counted; and means for terminaitng said third pulse prior to the sixth one of said first pulses immediately following said fifth one of said first pulses whereby said other pulse counting means counts two of said second pulses and the fifth one of each five successive first pulses of said train.

4. The system of claim 3 wherein said other pulse counting means includes means for converting the pulses counted thereby to binary coded decimal form.

5. The system of claim 1 wherein said means for providing said other pulses comprises: first AND gate means having a first input circuit coupled to receive said train of pulses and having an inhibit circuit and an output circuit; a first bistable multivibrator having an input circuit coupled to the output circuit of said first AND gate means and having an output circuit for providing a second pulse in response to every two of said first pulses of said train; a NOR circuit means having a first input circuit coupled to the output circuit of said first bistable multivibrator and having a second input circuit and an output circuit; two digit binary coded decimal register means coupled to the output circuit of said NOR circuit means; a second bistable multivibrator having an input circuit coupled to the output circuit of said first bistable multivibrator and having an output circuit for providing a third pulse in response to every two of said second pulses, the output circuit of said second bistable multivibrator being coupled to the inhibit circuit of said first AND gate means whereby said third pulse inhibits coupling of said first pulses to said first bistable multivibrator after four successive first pulses; a second AND gate means having two input circuits respectively coupled to receive said train of pulses and to the output circuit of said second bistable multivibrator and having an output circuit coupled to the second input circuit of said NOR circuit means; said second bistable multivibrator having a resetting circuit; and delay means coupling the output circuit of said second bistable multivibrator to said resetting circuit thereof for terminating said third pulse after the fifth one and prior to the sixth one of said first pulses immediately following said four successive first pulses whereby two successive ones of said second pulses and the fifth one of each successive five of said first pulses are loaded into said register means.

6. The system of claim 5 wherein said register means comprises two serially coupled 1–2–4–8 decade counters.

7. The system of claim 5 further comprising binary coded decimal-to-decimal converting means coupled to said register means.

8. A system for converting input electrical signal information in binary coded form indicating a two place decimal fraction of a degree to output electrical signal information indicating the corresponding minutes to the nearest half-minute comprising: first means for loading said binary coded input signal information in parallel onto a first group of eight input lines; means for providing a train of first pulses; means for converting said train of pulses into binary coded form, said converting means including second means for loading said binary coded train of first pulses in parallel onto a second group of eight lines; means coupled to said first and second group of lines for comparing said binary coded input signal information and said binary coded train of first pulses, said comparing means including means for providing a stop signal when said binary coded input signal information and binary coded train of pulses respectively indicate the same decimal number; means for terminating said train of first pulses in response to said stop signal whereby the number of said first pulses in said train is equal to said decimal fraction; means for providing three other pulses in response to every five successive first pulses of said train whereby the decimal fraction is multiplied by sixty; means for counting said other pulses, said other pulse counting means including means for providing said output signal information indicating the number of said other pulses counted thereby.

9. The system of claim 8 wherein said first loading means comprising two-digit storage register means whereby said binary coded input signal information simultaneously appears and is maintained on said first group of lines, and wherein said second loading means comprises two-digit binary coded decimal register means.

10. The system of claim 9 wherein said comparing means comprises identity circuit means respectively coupling corresponding ones of said first and second groups of lines.

11. The system of claim 9 wherein said terminating means comprises AND gate means having a first input circuit coupled to said means for providing said first pulses and having an output circuit coupled to said binary coded decimal register means, said AND gate having an inhibit circuit coupled to receive said stop signal.

12. A system for converting input electrical signal information in binary coded form indicating a two place decimal fraction of a degree to output electrical signal information indicating the corresponding minutes to the nearest half minute comprising: two-digit storage register means coupled to receive said binary coded input signal information for loading the same in parallel onto a first group of eight input lines; means for providing a train of first pulses first two-digit binary coded decimal register means coupled to receive said first pulses for loading the same in parallel onto a second group of eight lines; means coupled to said first and second group of lines for comparing said binary coded input signal information and said binary coded train of first pulses, said comparing means including means for providing a stop signal when said binary coded input signal information and binary coded train of pulses respectively indicate the same decimal number; means for terminating said train of first pulses in response to said stop signal whereby the number of said first pulses in said train is equal to said decimal fraction; means for generating a second pulse in response to every two of said first pulses of said train whereby two successive second pulses are generated in response to four successive first pulses; means for generating a third pulse in response to every two of said second pulses; means for inhibting said second pulse generating means in response to said third pulse; second two digit binary coded decimal register means coupled to receive said second pulses; said inhibiting means including means for coupling said first pulses of said train to said second register means whereby each fifth one of said first pulses immediately following said four successive first pulses is loaded into said second register means; and means for terminating said third pulse prior to the sixth one of said first pulses immediately following said fifth one of said first pulses whereby two successive ones of said second pulses and the fifth one of each five successive first pulses of said train are loaded into said second register means.

No references cited.

MAYNARD R. WILBUR, *Primary Examiner.*

W. J. KOPACZ, *Assistant Examiner.*